US008705221B2

(12) United States Patent
Daum

(10) Patent No.: US 8,705,221 B2
(45) Date of Patent: Apr. 22, 2014

(54) SURGE ARRESTER HAVING AN OPTICAL FAULT INDICATOR

(75) Inventor: Richard Daum, Neumarkt/Opf. (DE)

(73) Assignee: DEHN + SÖHNE GmbH + Co. KG, Neumarkt/Opf. (DE)

( * ) Notice: Subject to any disclaimer, the term of this patent is extended or adjusted under 35 U.S.C. 154(b) by 381 days.

(21) Appl. No.: 13/138,090

(22) PCT Filed: Dec. 1, 2009

(86) PCT No.: PCT/EP2009/066112
§ 371 (c)(1),
(2), (4) Date: Sep. 30, 2011

(87) PCT Pub. No.: WO2010/079015
PCT Pub. Date: Jul. 15, 2010

(65) Prior Publication Data

US 2012/0014028 A1 Jan. 19, 2012

(30) Foreign Application Priority Data

Jan. 12, 2009 (DE) ........................ 10 2009 004 345
May 20, 2009 (DE) ........................ 10 2009 022 069

(51) Int. Cl.

*H01C 7/12* (2006.01)
*H02H 1/00* (2006.01)
*H02H 1/04* (2006.01)
*H02H 3/22* (2006.01)
*H02H 9/06* (2006.01)
*H02H 5/04* (2006.01)
*H02H 3/20* (2006.01)
*H02H 9/04* (2006.01)

(52) U.S. Cl.
USPC .......... 361/118; 361/103; 361/104; 361/111; 361/91.1; 361/124

(58) Field of Classification Search
USPC ........................................................ 361/118
See application file for complete search history.

(56) References Cited

U.S. PATENT DOCUMENTS 6,430,019 B1 * 8/2002 Martenson et al. ........... 361/124
7,839,257 B2 * 11/2010 Cernicka ....................... 337/206
8,482,896 B2 * 7/2013 Grewe et al. .................. 361/127

FOREIGN PATENT DOCUMENTS

CN 201331984 10/2009 ............... H01C 7/12
DE 7719678 1/1979 ................ H01T 4/02
DE 19545505 5/1997 ............... H01C 7/12

OTHER PUBLICATIONS

Notification Concerning Transmittal of International Preliminary Report on Patentability (Chapter I of the Patent Cooperation Treaty), in English, dated Jul. 21, 2011, International Preliminary Report on Patentability (Chapter I of the Patent Cooperation Treaty), in English, dated Aug. 2, 2011, and International Search Report, in English, dated Mar. 5, 2010.

*Primary Examiner* — Jared Fureman
*Assistant Examiner* — Lucy Thomas
(74) *Attorney, Agent, or Firm* — Gerald T. Bodner

(57) ABSTRACT

The invention relates to a surge arrester which, in a housing (7), has at least one arrester element (3), in particular a varistor, a solder-fixed thermal disconnection point (5), which is connected to the arrester element, and a damage indicating device (11) for displaying the fault state, wherein the damage indicating device also queries the state of a thermal disconnection device, in particular a fuse, and presents the possible fault states of the arrester element and of the disconnection device mechanically in an OR combination in a suitable way. Furthermore the thermal disconnection device comprises a movable component, which is fixed by an indicator wire and is released after the melting or destruction of said wire. According to the invention, a guide part (9) for a compression spring (10) or similar force accumulator is provided on or in the housing.

20 Claims, 11 Drawing Sheets

SURGE ARRESTER HAVING AN OPTICAL FAULT INDICATOR

Figure 1:
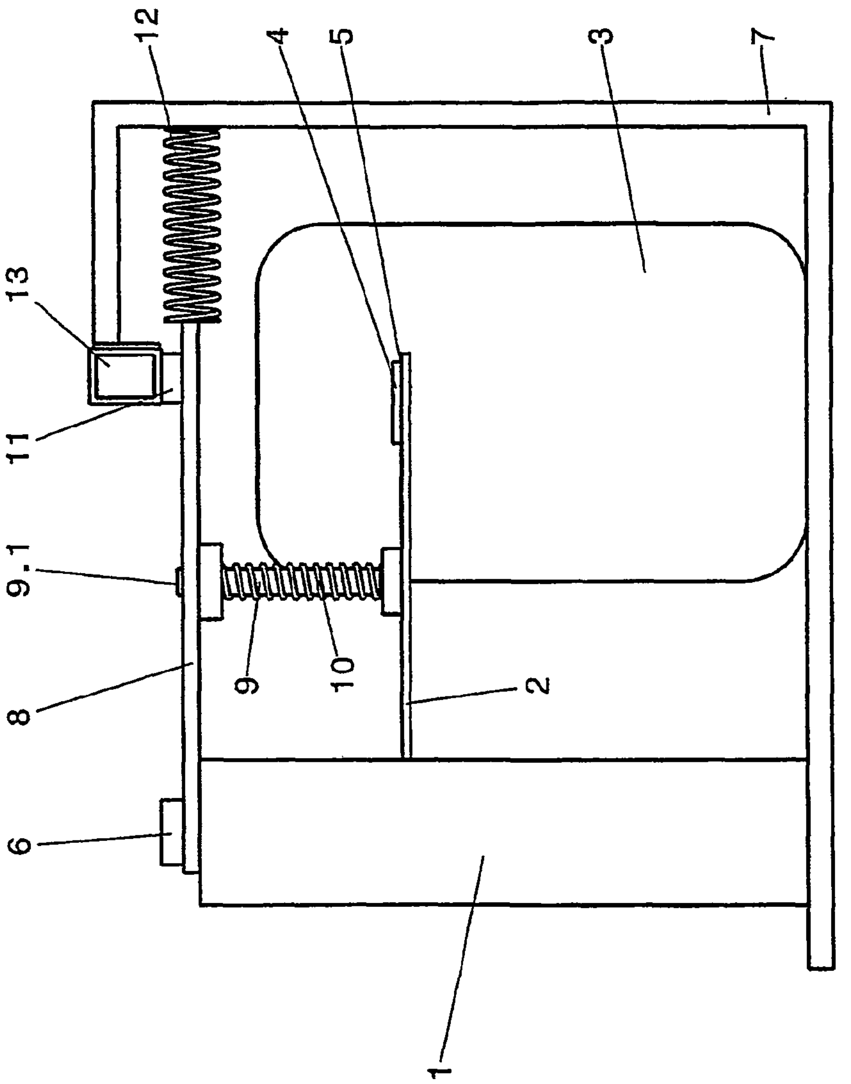

The invention relates to a surge arrester which, in a housing, has at least one arrester element, in particular a varistor, a solder-fixed thermal disconnection point, which is connected to the arrester element, and a damage indicating device for displaying the fault state, wherein the damage indicating device additionally queries the state of a thermal disconnection device, in particular a fuse, and presents the possible fault states of the arrester element and of the disconnection device mechanically in an OR operation in a suitable visual way, wherein further the thermal disconnection device comprises a movable component, which is fixed by an indicator wire and is released after the melting or destruction of said wire, according to the preamble of patent claim 1.

Surge arresters having at least one voltage-dependent resistor and thermal disconnection devices, which are formed of a fuse strip and a thermal trigger device with an eutectic fusible alloy, wherein, when the fuse strip or the thermal trigger device are disconnected by a spring force, a damage indicator is displaced and thus made visible, are known, for instance, from DE 77 19 678 U1. According to such a solution a plate carrying the damage indicator, the fuse strip, the thermal trigger device and a voltage-dependent resistor adjacent to the same are electrically and mechanically connected in series and fixed to each other. The aforementioned components, including a spark gap additionally provided in the series arrangement, are accommodated in a common housing. A trigger spring is supported between a base plate and the plate of the damage indicator. The fuse strip including the soldering joint is fixedly clamped between the two aforementioned plates and is thus subjected to a permanent tensile stress caused by the trigger spring. This involves the risk that the fuse strip subjected to the tensile stress breaks open when mechanically stressed.

DE 195 45 505 C1 shows a surge arrester comprising a varistor and thermal disconnection devices. A fuse strip resistant to a surge current is disposed in a fuse housing with metal end caps and is electrically and mechanically connected to the end caps. The damage indicator is a separate component, which is detachably fixed to the fuse housing and, after the detachment, is movable relative from the fuse housing by a spring. The assembly is configured such that the attachment of the damage indicator in the fuse housing is undone and released when the fuse strip melts. The thermal trigger device according to DE 195 45 505 is located outside the fuse housing and is connected to the varistor in a thermally conductive manner. The thermal trigger device and the thermally conductive connection are configured to disconnect the thermal trigger device if the varistor is unacceptably heated, thereby indicating a damage.

According to DE 195 45 505 C1 it is a particular advantage that a reduced space requirement is obtained by activating the same damage indicator both when the fuse indicator melts and when the thermal trigger device is activated. The space requirement is also reduced if, when the thermal trigger device is activated, the fuse housing is displaced by means of a spring force, whereby preferably the same spring is used which is already provided for moving the indicator after the fuse strip and the indicator wire have molten. The fuse strip of the fuse is dimensioned to melt only when the arrester is defect, or in the event of an overload due to the correspondingly high short circuit current resulting therefrom, thus acting as a trigger. According to the prior teaching this triggering has the effect that the attachment of the damage indicator on the fuse housing is removed or released. The thermal trigger device in the form of an eutectic soldering joint according to DE 195 45 505 C1 serves to interrupt the flow of current through the apparatus if the varistor is unacceptably heated. To this end, the previously firm attachment of the fuse housing in a corresponding position is undone due to the melting of the solder of the thermal trigger device. As a consequence, springs displace the complete fuse housing into a new position, so that also the damage indicator adopts this changed position. This means, that the complete fuse housing has to be displaced in any event, which naturally requires great spring forces.

Based on the foregoing it is therefore the object of the invention to provide a further developed surge arrester, comprising an arrester element, in particular a varistor, and an additional thermal disconnection device, in particular a fuse, which provides for a damage indication in all possible fault states with as few components as possible.

The solution to the object of the invention is achieved with a surge arrester according to the combination of features defined in patent claim 1. The dependent claims define at least useful embodiments and further developments.

According to the invention a surge arrester is provided which, in a housing, has at least one arrester element, in particular a varistor, a solder-fixed thermal disconnection point, which is connected to the arrester element, and a damage indicating device for displaying the fault state. The damage indicating device additionally queries the state of a thermal disconnection device, in particular a fuse, and presents the possible fault states of the arrester element and of the disconnection device mechanically in an OR operation in a suitable way, namely at least visually or additionally by a remote signaling function. The thermal disconnection device comprises a movable component, which is fixed by an indicator wire and is released after the melting or destruction of said wire.

According to the invention, a guide part for a compression spring or similar force accumulator is provided on or in the housing. A first spring end acts on the thermal disconnection point directly or indirectly by way of a disconnection plunger or disconnection cylinder, and a second spring end of the force accumulator, opposite to the first end, acts on a slide directly or indirectly by way of a guide ring.

The slide is subjected to a force on a first side in the displacement direction directly by a further spring or indirectly by the damage indicating device.

The second side of the slide, opposite to the first side, is operatively connected to the movable component of the thermal disconnection device in such a way that it follows the release movement of the movable component under the action of force from the compression spring.

The second side of the slide is designed in such a way that a longitudinal slide movement is able to take place as a result of the force of the further spring with the thermal disconnection point triggered and the component of the thermal disconnection device fixed and also with an unchanged position between the slide and guide part and, furthermore, a reciprocating movement relative to the guide part is able to take place, with a subsequent longitudinal slide movement, with the indicator wire released, together with the movable component of the thermal disconnection device.

The second end of the spring or at least part of the guide ring engages into a cut-out or depression in the slide in order to lock the latter and the damage indicating device in the proper state of the arrester.

According to an embodiment the guide part includes an inner cylindrical area for receiving the compression spring and at least one section of the disconnection plunger or disconnection cylinder. The guide part may be an integral part of the housing, which can be fabricated, for instance, as an injection-molded plastic part.

The slide is arranged with its flat side transversely to the longitudinal axis of the cylindrical area of the guide part on the upper side thereof, wherein the guide ring includes a prolongation which engages into the cut-out in the slide corresponding thereto and serves the aforementioned locking.

The compression spring is supported as a first abutment relative to the slide and as a second abutment relative to a disconnection tongue of the thermal disconnection point.

The second spring can preferably be designed as a leaf spring, whose fixed end is held by a molded section in the housing.

The housing may be part of a plug-in insert and covered by a housing cap.

In one embodiment the second side of the slide is fork-shaped, wherein the prongs of the fork engage behind a reduced diameter section of the movable component. To this end, the movable component may be designed as a hat-shaped bolt.

In another embodiment the disconnection tongue is part of the thermal disconnection device and is connected to it electrically and mechanically.

The damage indicating device may be pivotably movable and is guided on a bearing journal associated with the housing. The damage indicator further comprises a surface section which is provided with a signal color. By a movement of the damage indicating device inside a window section of the housing cap a color change can then be detected visually, and a possible fault state, e.g. from green to red, can be determined. Additionally, the damage indicating device can be provided with a prolongation or lever arm at one of its pivotably movable ends, which serves to trigger a remote signaling indicator.

In one embodiment of the invention the housing may comprise a partition wall, wherein the at least one arrester element is located on one side of the partition wall and the thermal disconnection point with the guide part for the compression spring, the slide and the further spring are located on the other opposite side of the partition wall.

The thermal disconnection device can be designed as a cylindrical fuse with two opposite caps, wherein the movable component fixed by the indicator wire is disposed on one of the caps.

The invention further provides for the functional separation of the force accumulator function for the thermal disconnection point and for the movable component of the disconnection device on the one hand, and for the movement of the damage indicating device on the other hand.

Figure 2:
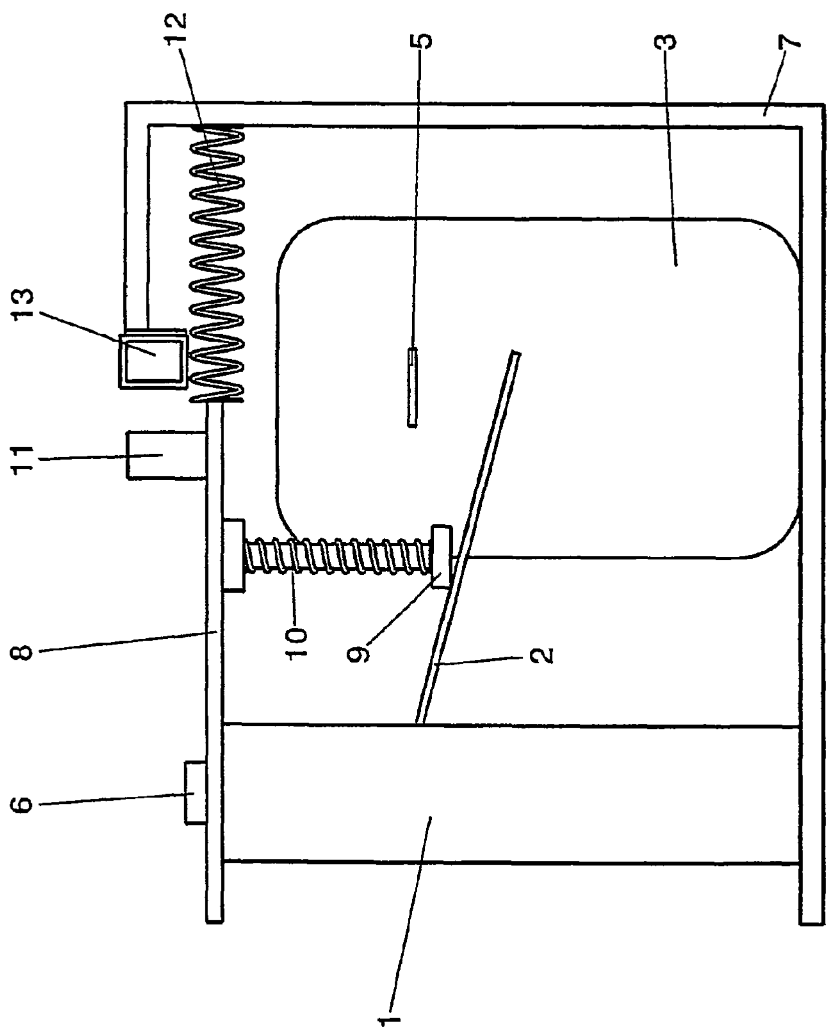
Figure 3:
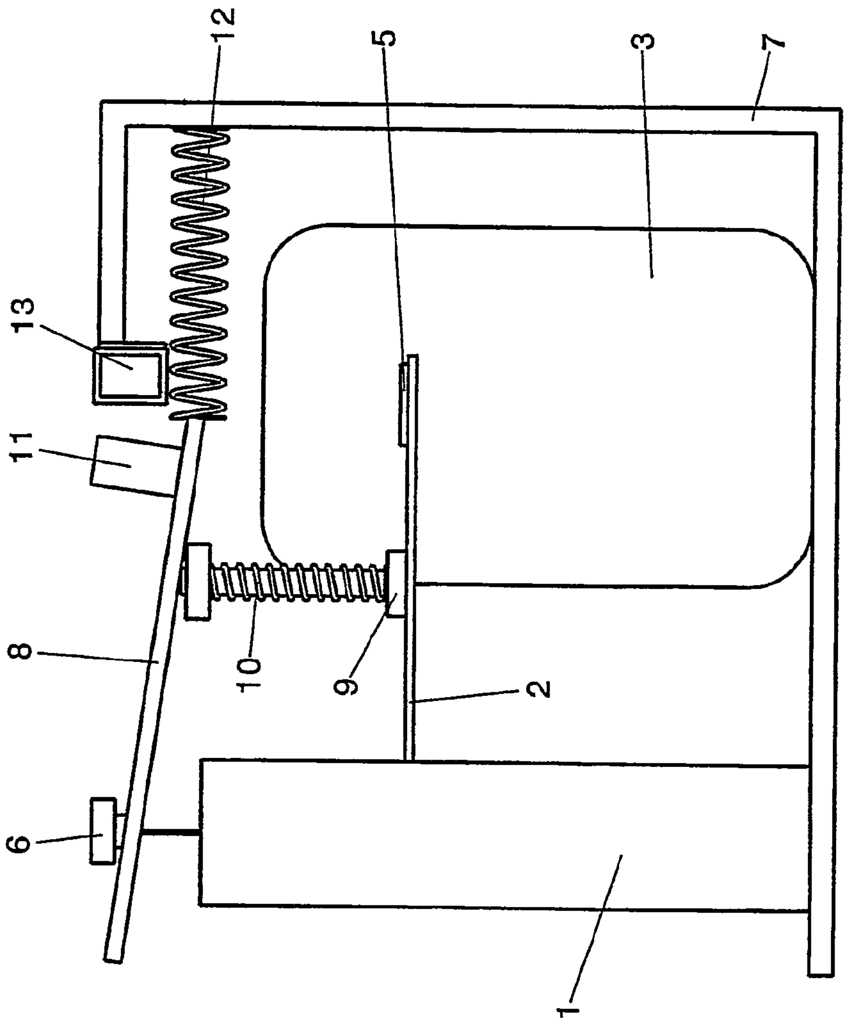
Figure 4A:
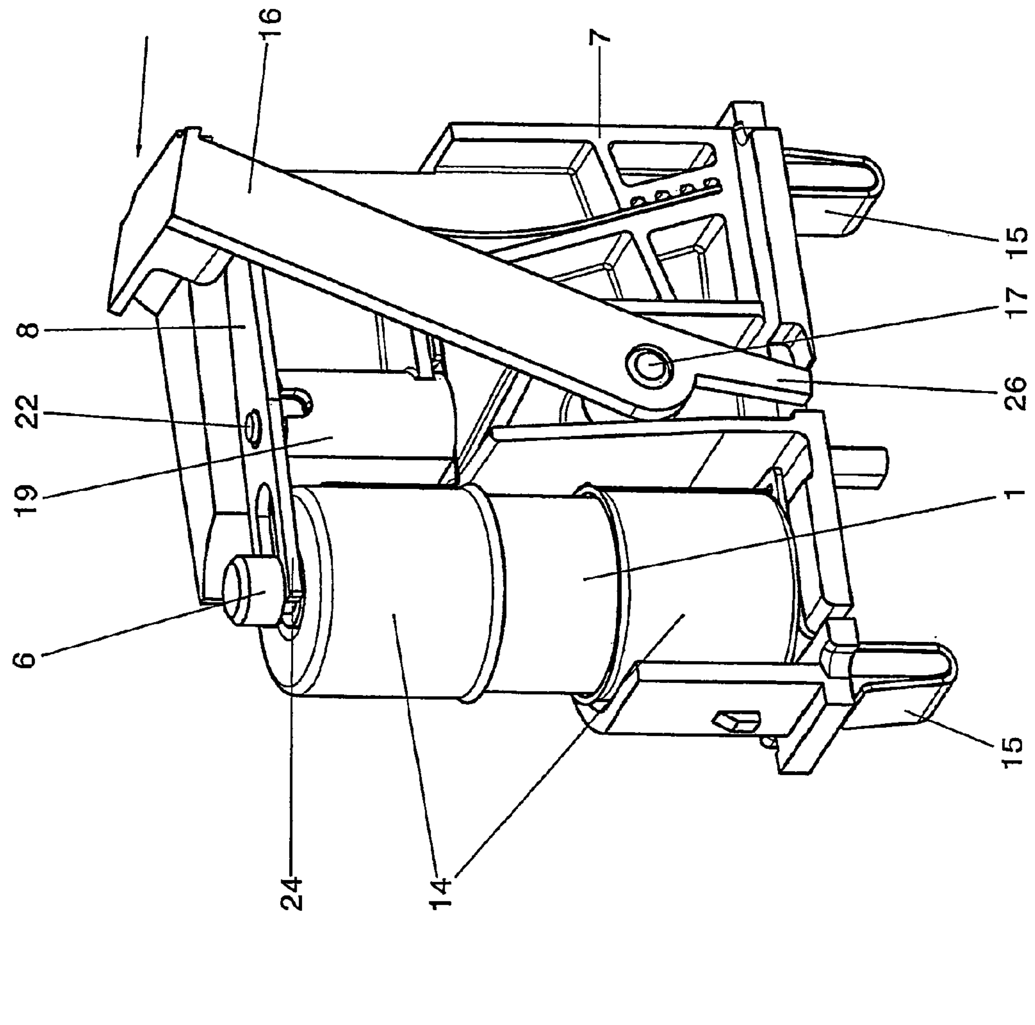
Figure 4B:
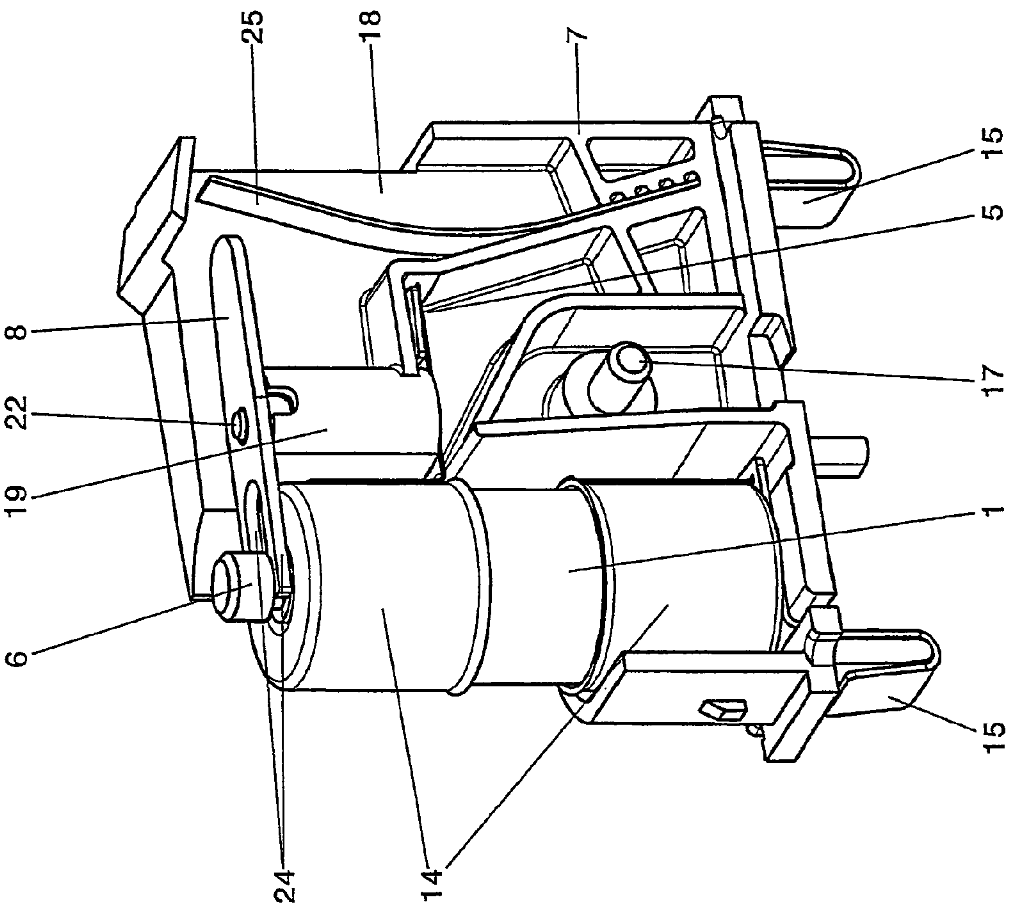
Figure 5A:
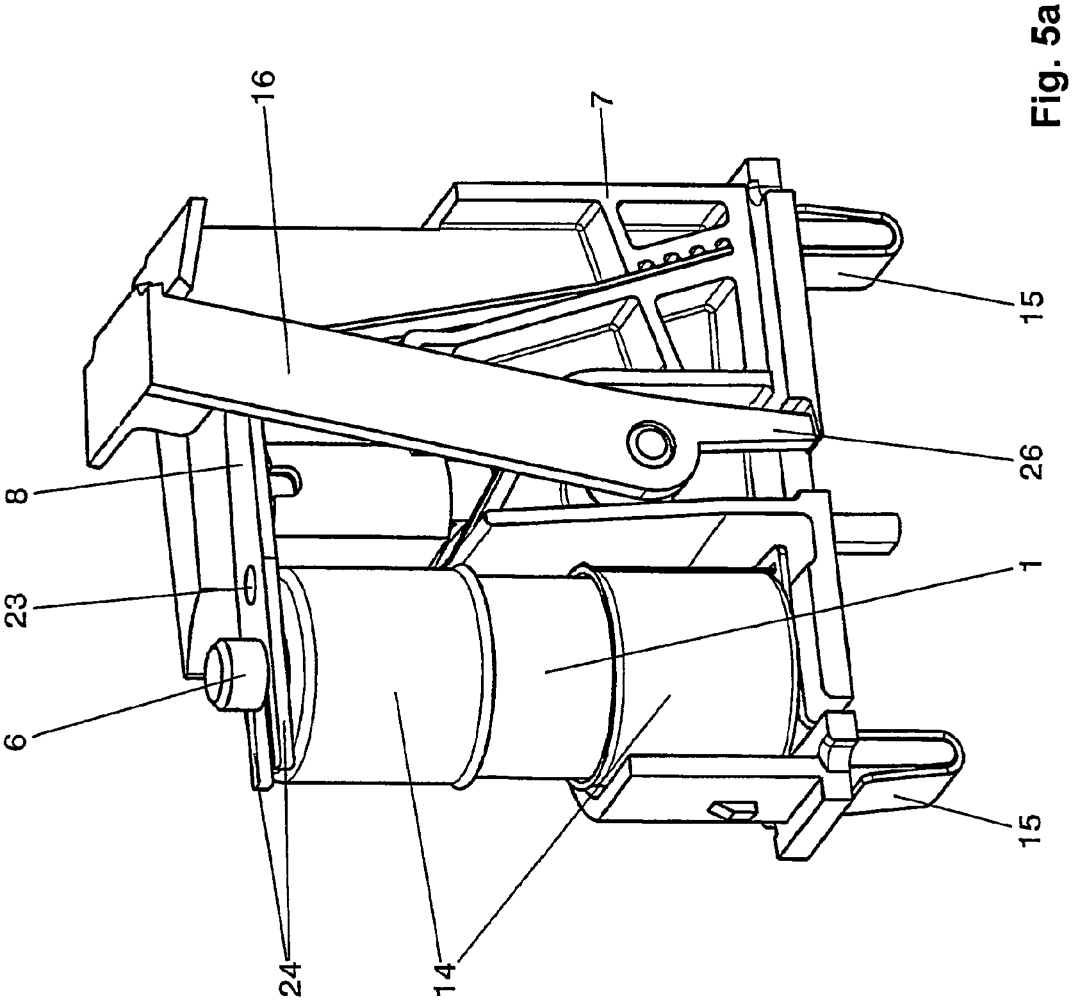
Figure 5B:
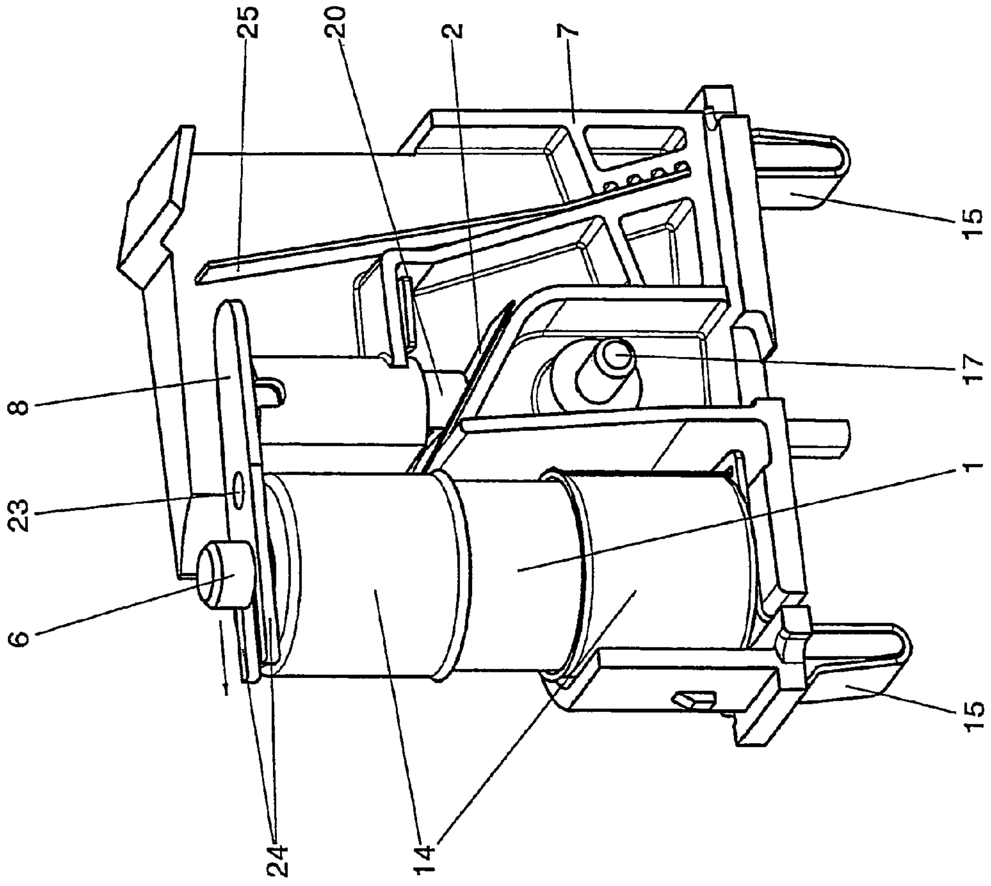
Figure 6A:
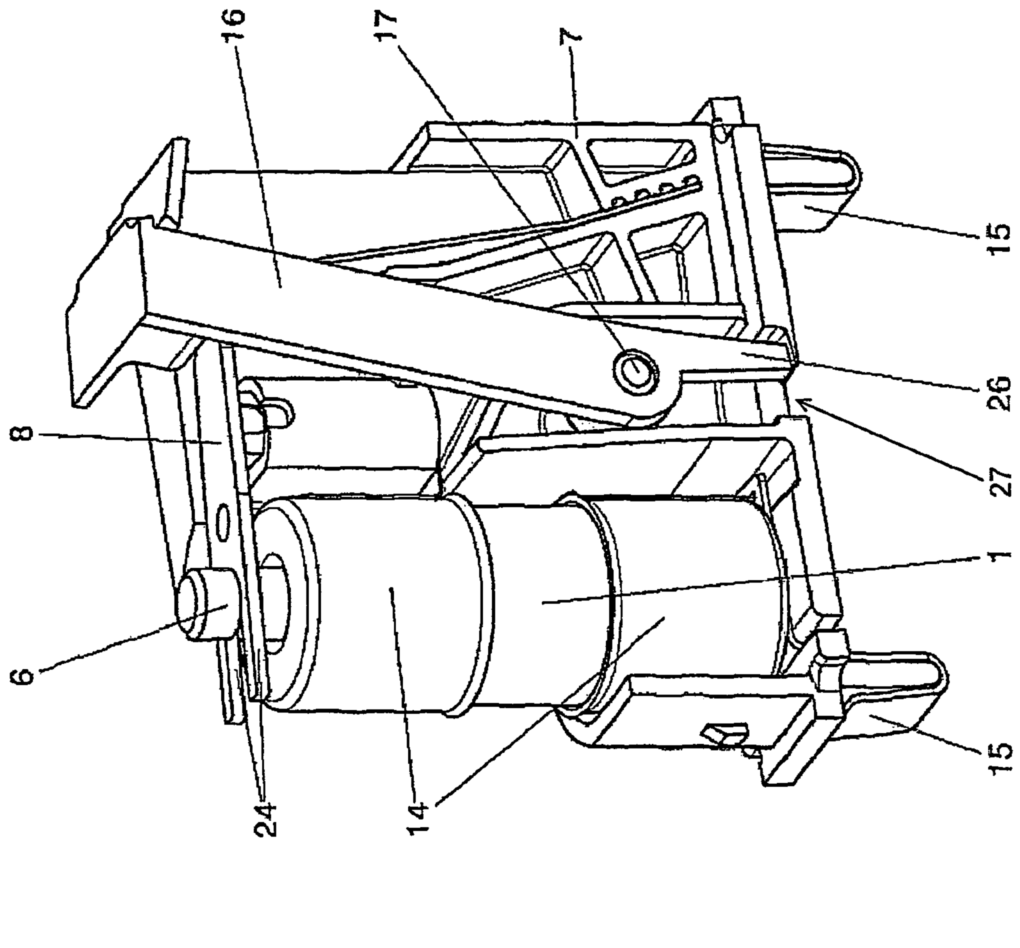
Figure 6B:
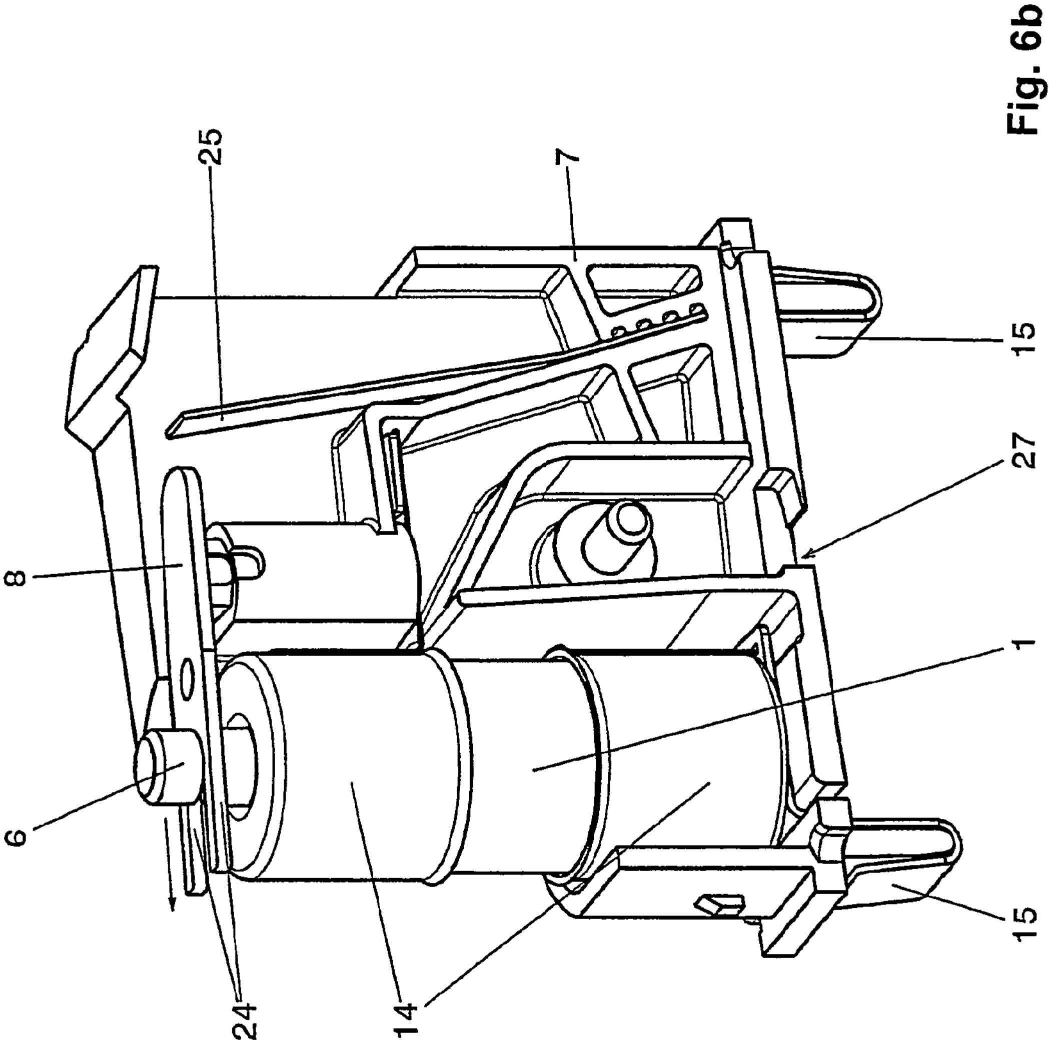
Figure 7:
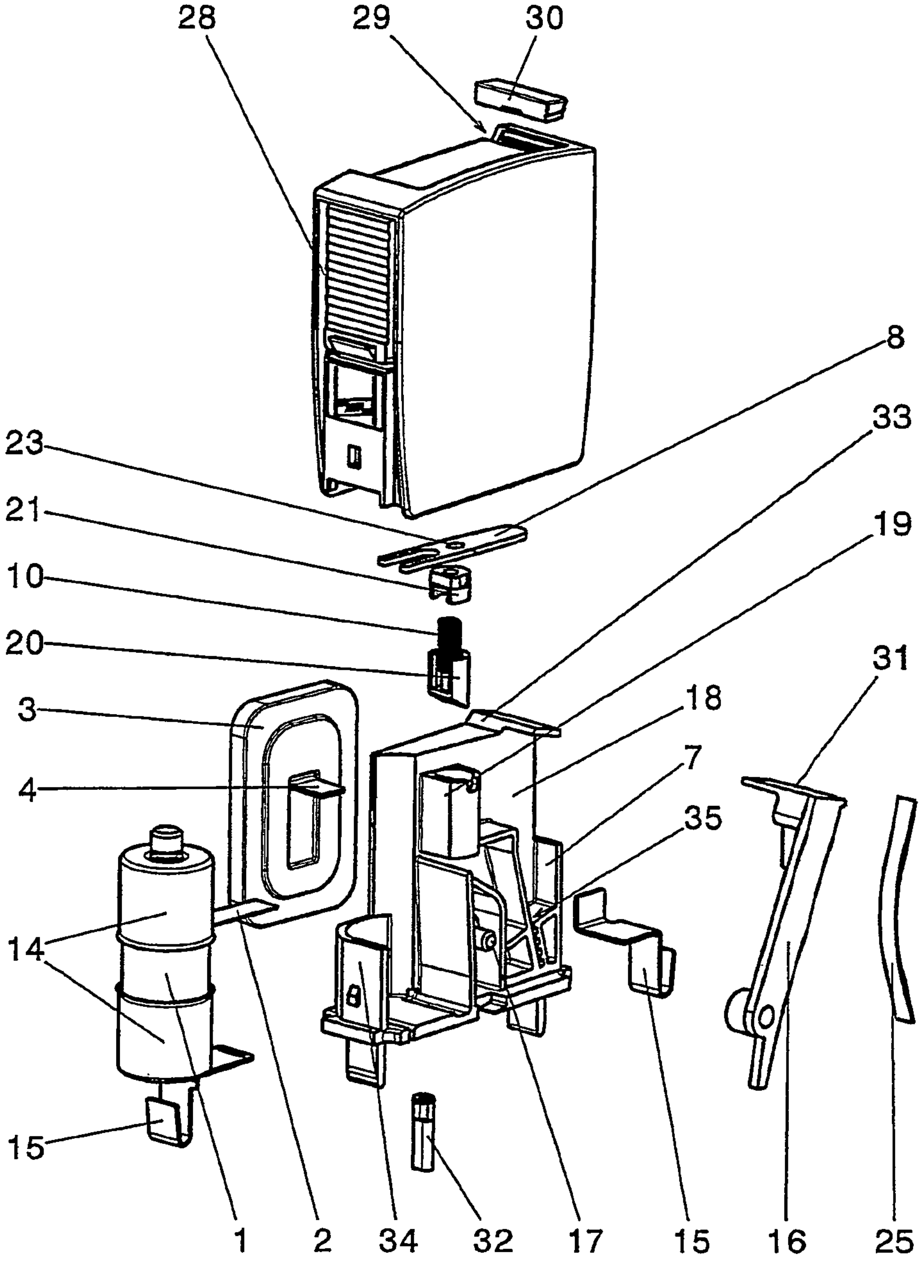
Figure 8:
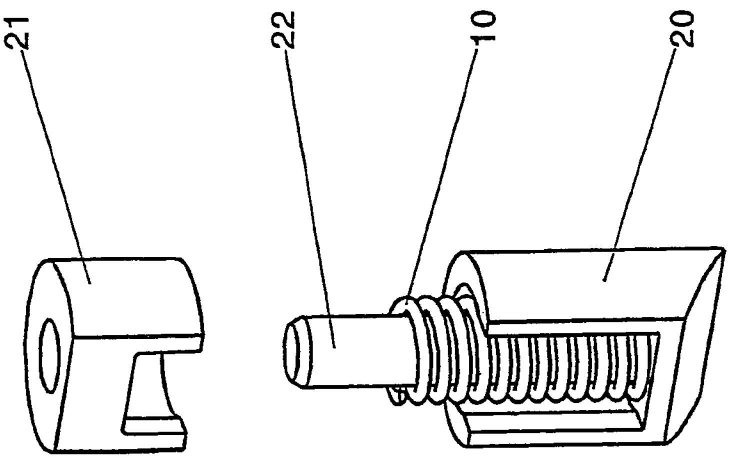

The invention shall be explained in more detail below by means of an embodiment and with the aid of figures. In the drawings:

FIGS. 1 to 3 show simplified representations of the basic principle of the assembly formed of a slide with a compression spring and of the assembly formed of the fuse and the varistor, with FIG. 1 showing the proper state, FIG. 2 showing the state when the thermal disconnection point is triggered, and FIG. 3 showing the state when the fuse is triggered;

FIG. 4*a* shows a representation of a more specified embodiment of the invention, with a partially cut off housing without the housing cap and a discernible position of the damage indicating device;

FIG. 4*b* shows a representation similar to that of FIG. 4*a*, but without the damage indicating device for the better recognizability of the thermal disconnection point and the leaf spring;

FIG. 5*a* shows a representation similar to that of FIG. 4*a*, but with a triggered thermal disconnection point caused by reaching the overloaded state of the varistor and the changed position of the damage indicating device resulting therefrom;

FIG. 5*b* shows a representation similar to that of FIG. 5*a*, but without the damage indicating device for the better recognizability of the opened thermal disconnection point;

FIG. 6*a* shows a representation similar to those of FIGS. 4*a* and 5*a*, but with a triggered fuse and, as a result thereof, lifted bolt-type component on the upper side of the fuse, as well as the resulting "red" position caused by the shifted position of the damage indicating device;

FIG. 6*b* shows a representation similar to that of FIG. 6*a*, but without the damage indicating device in order to better illustrate the position of the slide;

FIG. 7 shows an exploded view of a complete surge arrester plug-in part with the housing and the housing cap as well as the inventive components for indicating a damage and, thus, detecting a fault; and FIG. 8 shows a detailed view of the disconnection cylinder including a prolongation and guide ring.

The basic principle of the solution according to the invention shall first be explained by means of FIGS. 1 to 3, showing the functional units in a simplified way.

According to the representations shown in FIGS. 1 to 3 a thermal disconnection device in the form of a fuse 1 is initially provided. This fuse 1 is connected to an arrester element, in particular a varistor 3, by a disconnection tongue 2. A contact 4 of the varistor 3 forms together with one end of the disconnection tongue a solder-fixed thermal disconnection point 5.

An indicator wire (not shown) is located inside the fuse, which is connected to a movable bolt 6 located at the upper end. If the indicator wire melts, the bolt 6 can perform an upward movement, as is represented in FIGS. 1 to 3. In the proper state of the fuse 1 the movement of the bolt 6 is blocked.

The aforementioned components are located in a housing 7, which is not completely shown in the representations of FIGS. 1 to 3.

Moreover, according to the invention, a slide 8 is provided.

A guide part 9 with a compression spring 10 is located between a bottom side of the slide 8 and a top side of the disconnection tongue 2.

The compression spring generates a force acting between the slide 8 and the disconnection tongue 2.

Also, a cut-out is provided in the slide, into which an upper end 9.1 of the guide part 9 can engage so as to lock the slide in the proper state of the surge arrester according to FIG. 1 together with the display 11, with respect to the force of the further spring 12.

In the state according to FIG. 1 the "OK" state can be recognized in a viewing window 13 by means of the display 11 showing a green color.

If, as is shown in FIG. 2, the temperature at the disconnection point exceeds for instance 138° C., i.e. if the varistor 3 is unacceptably heated, a melting process takes place, as a result of which, and due to the force exerted by the spring 10, the guide part 9 moves downwardly together with the disconnection tongue 2, i.e. the disconnection point 5 is opened. At the same time, the upper end 9.1 departs from the corresponding cut-out in slide 8. The force of spring 12 can then move the slide 8 in the direction of the illustrated arrow, i.e. to the left according to FIG. 2. The display in the viewing window 13 changes to the color "red". The fault state resulting from the opened thermal disconnection point 5 is clearly signalized.

If a fault state according to FIG. 3 occurs, in which the fuse 1 opens, the indicator wire melts, as a result of which the bolt 6 can move away from the fuse body in an upward direction. By this, too, the upper end 9.1 of the guide part 9 is released, and the slide can perform a movement in the direction of the arrow to the left under the action of the force exerted by spring 12.

In this case, too, the display changes to "red", which can be seen in the viewing window 13.

A constructive implementation of the above-described basic solution shall be explained by means of FIGS. 4*a* to 6*b*.

FIGS. 4*a* and 4*b* show the proper state of the surge arrester, with a functional fuse and a closed thermal disconnection point 5. The fuse 1 is designed as a cylindrical part with two opposite caps 14. At a lower end of one of the caps 14 a plug-in contact 15 is provided, which forms an external terminal of the surge arrester, designed as a plug-in part. Another plug-in contact 15 is electrically connected to a counter-contact of the varistor (not shown in the following figures).

The before-mentioned bolt 6 is located on the upper cap 14 of fuse 1, which is fixed with respect to its position by an indicator wire inside the fuse 1.

The damage indicating device comprises a pivotably movable lever 16, which is held on a bearing journal 17 associated with the housing 7.

The housing 7 comprises a partition wall 18 which, in the example shown, runs substantially horizontally.

The varistor 3 is located on the one side of the partition wall (see FIG. 7). On the other side of the partition wall 18 a guide 19 is formed on the housing.

This guide 19 receives the spring 10 (compression spring) symbolically illustrated in FIGS. 1 to 3 in its interior. A lower end of the compression spring 10 is received by a disconnection cylinder 20, with an upper end of the compression spring being placed in a guide ring 21.

The guide ring 21 receives a prolongation 22 which engages into a corresponding cut-out 23 in slide 8. The prolongation 22 is part of the disconnection cylinder 20.

In this respect, reference is also made to FIG. 7.

On its end shown on the left in the figures the slide 8 is fork-shaped, and the prongs 24 encompass a recessed section of the bolt 6. Thus, if the slide 8 is released from the prolongation 22, the slide 8 can move in the longitudinal direction so that a blocking function of the pivotably movable lever 16 can be unblocked.

The pivotably movable lever 16 is supplied with a prestressing force by a leaf spring 25. This leaf spring 25 corresponds to the further spring 12 according to FIGS. 1 to 3. As is shown in FIGS. 5*a* and 5*b* the thermal disconnection point 5 was opened by a corresponding thermal load and by reaching the melting temperature of the joining solder. The disconnection cylinder 20 moves downwardly, taking with it the disconnection tongue 2 which is connected to the fuse 1. As a result of this movement of the disconnection cylinder 20 downwardly the guide ring 21 with the prolongation 22 adopts a changed position, i.e. the cut-out 23 in slide 8 is cleared.

The leaf spring 25 can now exert a compressive force via the pivotably movable lever 16 on the slide, and the slide moves with its prongs 24 along the recessed section of the bolt 6. In the (non-illustrated) window the color "red" now becomes visible as a result of the changed position of the pivotably movable lever 16, which indicates a fault state.

If the fuse is opened and the indicator wire in the fuse 1 melts, however (see FIGS. 6*a* and 6*b*), the force of the compression spring 10 can lift the slide 8, namely by taking with it bolt 6 which is now released. The now occurring longitudinal movement of the slide 8 under the action of the leaf spring 25 associated with pivotably movable lever 16, again, releases the red display field signalizing a "malfunction".

A lower end of the pivotably movable lever 16, which is provided with reference number 26, can actuate a remote signaling contact (not shown) via an open section 27 in the housing 7.

The subassembly fuse 1 with plug-in contact 15 may be prefabricated outside the housing 7 in a separate device, and may then be used to complete the surge arrester.

FIG. 7 shows in an exploded view once again all significant parts of the surge arrester.

Reference is additionally made to the covering cap or covering hood 28, which includes an opening 29 to receive a transparent insert 30 serving as window for the fault indication. The pivotably movable lever 16 has a colored surface on its top side, which serves as a green display 31. A coding pin 32 can be fixed in a known manner to the carrier insert 33 at the bottom side thereof so as to allow a safe assignment of the plug-in part to a non-illustrated base part.

The carrier insert 33, which is part of the housing 7, is provided with the necessary shaped sections for the individual elements for the fixing thereof, and reference is additionally made to a shaped section 34 for the fuse 1 and the guide 19 to receive the spring with the disconnection cylinder 20. The leaf spring 25 is held in a slot-type shaped section 35 in the carrier insert 33 which is advantageous for the purpose of an easier assembly.

LIST OF REFERENCE NUMBERS

1 fuse
2 disconnection tongue
3 varistor
4 contact of the varistor
5 thermal disconnection point
6 bolt
7 housing
8 slide
9 guide part
9.1 upper end of guide part
10 compression spring
11 display
12 further spring
13 viewing window
14 cap
15 plug-in contact
16 pivotably movable lever
17 bearing journal
18 partition wall
19 guide
20 disconnection cylinder
21 guide ring
22 prolongation
23 cut-out
24 prongs
25 leaf spring
26 lower end of pivotably movable lever
27 open section
28 covering cap
29 opening
30 transparent insert
31 green display
32 coding pin
33 carrier insert
34 shaped section
35 slot-type section

The invention claimed is:

1. Surge arrester which, in a housing, has at least one arrester element, in particular a varistor, a solder-fixed thermal disconnection point, which is connected to the arrester element, and a damage indicating device for displaying fault states, wherein the damage indicating device additionally queries the state of a thermal disconnection device, in particular a fuse, and presents the possible fault states of the arrester element and of the disconnection device mechanically in an OR operation in a suitable way, wherein further the thermal disconnection device comprises a movable component, which is fixed by an indicator wire and is released after the melting or destruction of said wire, characterized in that a guide part for a compression spring or similar force accumulator is provided on or in the housing, wherein a first spring end acts on the thermal disconnection point directly or indirectly by way of a disconnection plunger or disconnection cylinder, and a second end of the compression spring, opposite to the first end, acts on a slide directly or indirectly by way of a guide ring, the slide is subjected to a force on a first side in the displacement direction directly by a further spring or indirectly by the damage indicating device, wherein the second side of the slide, opposite to the first side, is operatively connected to the movable component of the thermal disconnection device in such a way that it follows the release movement of the movable bolt under the action of force from the compression spring, the second side of the slide is designed in such a way that a longitudinal slide movement is able to take place as a result of the force of the further spring with the thermal disconnection point triggered and the component of the thermal disconnection device fixed and also with an unchanged position between the slide and guide part and, furthermore, a reciprocating movement relative to the guide part is able to take place, with a subsequent longitudinal slide movement, with the indicator wire released, together with the movable component of the thermal disconnection device, and that the second end of the spring or at least part of the guide ring engages into a cut-out or depression in the slide in order to lock the latter and the damage indicating device in the proper state of the arrester.

2. Surge arrester according to claim 1, characterized in that the guide part includes an inner cylindrical area for receiving the compression spring and at least one section of the disconnection plunger or disconnection cylinder.

3. Surge arrester according to claim 2, characterized in that the slide is arranged with its flat side transversely to the longitudinal axis of the cylindrical area of the guide part on the upper side thereof, wherein the guide ring receives a prolongation which engages into the cut-out in the slide corresponding thereto.

4. Surge arrester according to claim 1, characterized in that the compression spring is supported as a first abutment relative to the slide and as a second abutment relative to a disconnection tongue of the thermal disconnection point.

5. Surge arrester according to claim 1, characterized in that the second spring is designed as a leaf spring, whose fixed end is held by a molded section in the housing.

6. Surge arrester according to claim 1, characterized in that the second side of the slide is fork-shaped, wherein the prongs of the fork engage behind a reduced diameter section of the movable bolt.

7. Surge arrester according to claim 4, characterized in that the disconnection tongue is part of the thermal disconnection device and is connected to it electrically and mechanically.

8. Surge arrester according to claim 1, characterized in that the damage indicating device is pivotably movable and is guided on a bearing journal associated with the housing.

9. Surge arrester according to claim 1, characterized in that the housing comprises a partition wall, wherein the at least one arrester element is located on one side of the partition wall and the thermal disconnection point with the guide part for the compression spring, the slide and the further spring are located on the other side of the partition wall.

10. Surge arrester according to claim 1, characterized in that the thermal disconnection device is designed as a cylindrical fuse with two opposite caps, and the movable component fixed by the indicator wire is disposed on one of the caps.

11. Surge arrester according to one claim 1, characterized by a functional separation of the force accumulator function for the thermal disconnection point and for the movable component of the disconnection device on the one hand, and for the movement of the damage indicating device on the other hand.

12. Surge arrester according to claim 2, characterized in that the compression spring is supported as a first abutment relative to the slide and as a second abutment relative to a disconnection tongue of the thermal disconnection point.

13. Surge arrester according to claim 3, characterized in that the compression spring is supported as a first abutment relative to the slide and as a second abutment relative to a disconnection tongue of the thermal disconnection point.

14. Surge arrester according to claim 2, characterized in that the second spring is designed as a leaf spring, whose fixed end is held by a molded section in the housing.

15. Surge arrester according to claim 3, characterized in that the second spring is designed as a leaf spring, whose fixed end is held by a molded section in the housing.

16. Surge arrester according to claim 4, characterized in that the second spring is designed as a leaf spring, whose fixed end is held by a molded section in the housing.

17. Surge arrester according to claim 2, characterized in that the second side of the slide is fork-shaped, wherein the prongs of the fork engage behind a reduced diameter section of the movable bolt.

18. Surge arrester according to claim 3,
characterized in that
the second side of the slide is fork-shaped, wherein the prongs of the fork engage behind a reduced diameter section of the movable bolt.

19. Surge arrester according to claim 4,
characterized in that
the second side of the slide is fork-shaped, wherein the prongs of the fork engage behind a reduced diameter section of the movable bolt.

20. Surge arrester according to claim 5,
characterized in that
the second side of the slide is fork-shaped, wherein the prongs of the fork engage behind a reduced diameter section of the movable bolt.

* * * * *